United States Patent
Ha et al.

(10) Patent No.: US 10,826,336 B2
(45) Date of Patent: Nov. 3, 2020

(54) DISPLAY APPARATUS, DISPLAY SYSTEM, AND DRIVING METHOD OF THE SAME

(71) Applicant: SAMSUNG ELECTRONICS CO., LTD., Suwon-si (KR)

(72) Inventors: Ka-san Ha, Goyang-si (KR); Sung-yong Joo, Hwaseong-si (KR); Shin-ho Kang, Incheon (KR); Won-myung Woo, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 135 days.

(21) Appl. No.: 15/637,501

(22) Filed: Jun. 29, 2017

(65) Prior Publication Data
US 2018/0226843 A1 Aug. 9, 2018

(30) Foreign Application Priority Data
Feb. 9, 2017 (KR) .................. 10-2017-0017978

(51) Int. Cl.
| | |
|---|---|
| *H02J 50/90* | (2016.01) |
| *H02J 50/10* | (2016.01) |
| *H01F 38/14* | (2006.01) |
| *H01F 27/28* | (2006.01) |
| *H02J 5/00* | (2016.01) |
| *H02J 50/12* | (2016.01) |
| *H04N 5/63* | (2006.01) |
| *H02J 7/02* | (2016.01) |

(52) U.S. Cl.
CPC .......... *H02J 50/90* (2016.02); *H01F 27/2823* (2013.01); *H01F 38/14* (2013.01); *H02J 5/005* (2013.01); *H02J 50/10* (2016.02); *H02J 50/12* (2016.02); *H02J 7/025* (2013.01); *H04N 5/63* (2013.01)

(58) Field of Classification Search
CPC .................................. H02J 50/90; H02J 50/10
USPC .................. 307/104, 9.1, 10.1; 320/107–115
See application file for complete search history.

(56) References Cited

U.S. PATENT DOCUMENTS

| | | |
|---|---|---|
| 8,975,864 B2 | 3/2015 | Kim |
| 9,825,672 B2 | 11/2017 | Lee et al. |
| 2011/0121660 A1* | 5/2011 | Azancot .................. H02J 50/10 307/104 |

(Continued)

FOREIGN PATENT DOCUMENTS

| | | |
|---|---|---|
| JP | 2013-115838 A | 6/2013 |
| JP | 2014-150646 A | 8/2014 |

(Continued)

OTHER PUBLICATIONS

International Search Report and Written Opinion (PCT/ISA/210 and PCT/ISA/237), dated Nov. 9, 2017 by International Searching Authority in International Application No. PCT/KR2017/007418.

(Continued)

*Primary Examiner* — Tomi Skibinski
(74) *Attorney, Agent, or Firm* — Sughrue Mion, PLLC

(57) ABSTRACT

A display apparatus includes a main body; a power receiver configured to receive power from a wireless power transmission apparatus positioned outside of the main body; a driver configured to move the power receiver with respect to the main body; and a controller configured to control the driver to move the power receiver toward the main body or toward the wireless power transmission apparatus.

18 Claims, 16 Drawing Sheets

(56) References Cited

U.S. PATENT DOCUMENTS

| | | | |
|---|---|---|---|
| 2011/0148350 A1* | 6/2011 | Wegener | B60L 11/182 |
| | | | 320/108 |
| 2012/0206098 A1 | 8/2012 | Kim | |
| 2013/0015705 A1* | 1/2013 | Abe | H02J 5/005 |
| | | | 307/29 |
| 2014/0002013 A1 | 1/2014 | Kossi et al. | |
| 2014/0192270 A1 | 7/2014 | Park et al. | |
| 2014/0361633 A1 | 12/2014 | Abe | |
| 2015/0008756 A1 | 1/2015 | Lee et al. | |
| 2015/0255992 A1 | 9/2015 | Abe et al. | |
| 2016/0082848 A1 | 3/2016 | Ichikawa et al. | |
| 2016/0285317 A1 | 9/2016 | Maniktala | |
| 2016/0285319 A1 | 9/2016 | Maniktala | |
| 2016/0308397 A1 | 10/2016 | Jung et al. | |
| 2016/0308402 A1 | 10/2016 | Alavikia et al. | |
| 2016/0308403 A1 | 10/2016 | Bluvshtein et al. | |
| 2018/0309309 A1* | 10/2018 | Choe | H02G 11/02 |

FOREIGN PATENT DOCUMENTS

| | | |
|---|---|---|
| JP | 5914879 B2 | 5/2016 |
| KR | 10-2011-0042403 A | 4/2011 |
| KR | 10-1651436 B1 | 8/2016 |
| WO | 2013089289 A1 | 6/2013 |
| WO | 2016140462 A1 | 9/2016 |
| WO | 2016191656 A1 | 12/2016 |

OTHER PUBLICATIONS

Communication dated Oct. 7, 2019 issued by the European Patent Office in counterpart European Application No. 17895953.2.

Communication dated Jul. 10, 2020, issued by Intellectual Property India in Application No. 201917035367.

\* cited by examiner

FIG. 1
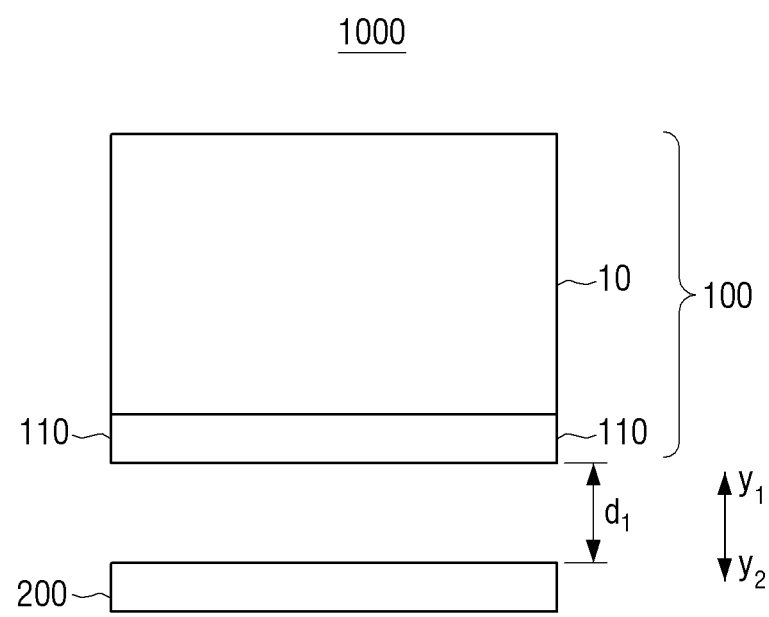
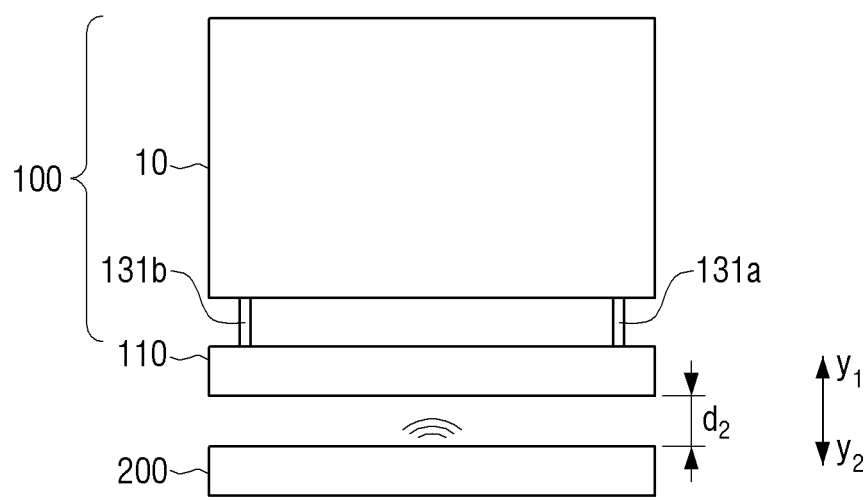

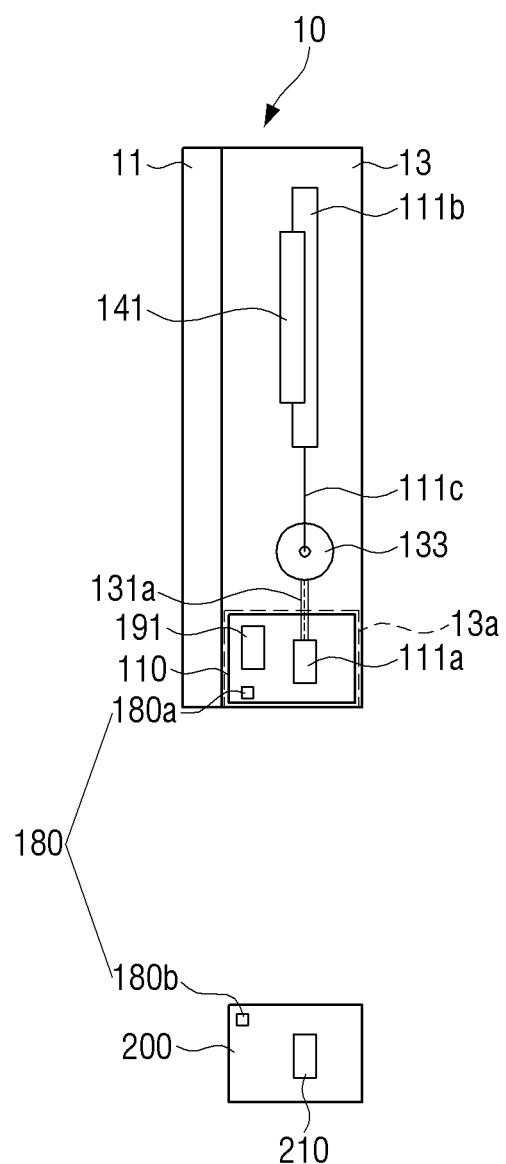

DISPLAY APPARATUS, DISPLAY SYSTEM, AND DRIVING METHOD OF THE SAME

CROSS-REFERENCE TO RELATED APPLICATIONS

This application claims priority from Korean Patent Application No. 10-2017-0017978 filed Feb. 9, 2017 in the Korean Intellectual Property Office, the disclosure of which is incorporated herein by reference in its entirety.

BACKGROUND

1. Field

The present disclosure relates to a display apparatus using a wireless power transmission technology, a display system including the same, and a driving method thereof. More particularly, the present disclosure relates to a display apparatus that can be used even when being spaced apart from a wireless power transmission apparatus by a predetermined distance or more, a display system including the same, and driving methods thereof.

2. Description of the Related Art

Display apparatuses may be connected by a wire to a connection device such as an electrical outlet, etc. which is installed on a floor, a wall, or a ceiling of a building, to be supplied with power.

When the display apparatus uses the wire connection method, the installation position and the movement range of the display apparatus are limited by the position of the electrical outlet, the length of the power cable, and the like.

Also, since the contact terminals provided on the display apparatus, the power cable and the adapter connected to the contact terminals are all exposed to the outside of the display apparatus, there is a risk that they may be easily contaminated with foreign substances or broken due to an external impact.

In addition, a contact failure may occur between the contact terminals and the power cable, which could lead to an accident, such as a fire due to a short circuit, or personal injury due to an electric shock.

Accordingly, a need for a technique capable of wirelessly supplying power to a display apparatus has arisen.

However, in order to transmit power wirelessly to a display apparatus in the related art, the display apparatus has to be arranged close to a wireless power transmission apparatus. Therefore, when arranging the display apparatus for practical use, the installation position of the display apparatus is limited.

Accordingly, there is a need for a display apparatus capable of effectively performing wireless power transmission even if the wireless power transmission apparatus is disposed at various positions separated from the display apparatus by a predetermined distance or more.

SUMMARY

Example embodiments provide a display apparatus which can effectively receive wireless power even when being spaced apart from a wireless power transmission apparatus by a predetermined distance or more, a display system including the same, and driving methods thereof.

According to an aspect of an example embodiment, there is provided a display apparatus including: a main body; a power receiver configured to receive power from a wireless power transmission apparatus positioned outside of the main body; a driver configured to move the power receiver with respect to the main body; and a controller configured to control the driver to move the power receiver toward the main body or toward the wireless power transmission apparatus.

The controller may include a processor configured to control operations of the display apparatus using the power received through the power receiver. In response to the display apparatus being in a standby state, the processor may control the driver to move the power receiver to a first position at the main body, and in response to the display apparatus being in a turn-on state, the processor may control the driver to move the power receiver from the first position at the main body in a direction of the wireless power transmission apparatus to a second position away from the main body.

The power receiver may include a first power receiving coil configured to generate an induced current by a magnetic field generated in the wireless power transmission apparatus, and the main body may include a second power receiving coil electrically connected to the first power receiving coil, the second power receiving coil configured to receive the induced current generated by the first power receiving coil.

The driver may include a plurality of connection lines connected to the power receiver; a plurality of bobbins connected to the plurality of connection lines; and a motor configured to wind or unwind the plurality of connection lines by rotating the plurality of bobbins in a clockwise direction or in a counter-clockwise direction.

Each of the plurality of connection lines may include a coil wire electrically connecting the first power receiving coil to the second power receiving coil; and an insulating sheath surrounding the coil wire.

Each of the plurality of bobbins may include a plate provided with a through hole; and a base coupled to the plate, the base including a guide groove configured to guide the plurality of connection lines, wherein the plurality of connection lines may pass through the through hole of the plate and may be fixed to the guide groove.

The base may include a plurality of threads on which the plurality of connection lines is wound, the plurality of threads being formed on a second surface opposite to a first surface coupled to the plate.

The display apparatus may include a standby power supplier configured to supply driving power to the driver and to the controller.

The display apparatus may include a sensor configured to measure a distance between the main body and the wireless power transmission apparatus, wherein in response to the display apparatus being turned on, the controller is configured to control the driver to move the power receiver toward the wireless power transmission apparatus until the distance measured by the sensor satisfies a predetermined distance range.

The power receiver may include a speaker.

According to an aspect of an example embodiment, there is provided a driving method of a display apparatus, the driving method including: positioning a power receiver included in the display apparatus on a main body of the display apparatus in response to the display apparatus being in a standby state; moving the power receiver in a direction of a wireless power transmission apparatus in response to the display apparatus being turned on; the wireless power transmission apparatus being positioned outside of the main body of the display apparatus, and receiving power transmitted from the wireless power transmission apparatus through the power receiver and operating the display apparatus.

The moving the power receiver may include measuring a distance between the main body of the display apparatus and the wireless power transmission apparatus; and moving the power receiver in the direction of the wireless power transmission apparatus until the distance satisfies a predetermined reference range.

According to an aspect of an example embodiment, there is provided a display system including: a wireless power transmission apparatus; and a display apparatus configured to operate using power transmitted from the wireless power transmission apparatus, wherein the display apparatus may include a power receiver configured to wirelessly receive the power from the wireless power transmission apparatus; a driver configured to move the power receiver with respect to a main body of the display apparatus; and a processor configured to control the driver to move the power receiver from the main body toward the wireless power transmission apparatus in response to the display apparatus being turned on.

The display system may include at least one electronic apparatus interlocked with the display apparatus using the power transmitted from the wireless power transmission apparatus.

The display system may include a remote control signal receiver disposed in the wireless power transmission apparatus and the display apparatus, respectively, wherein in response to a turn-on signal of the display apparatus being received by the remote control signal receiver, the wireless power transmission apparatus is configured to apply a current to a power transmission coil provided in the wireless power transmission apparatus to generate a magnetic field.

The display system may include a speaker included in at least one of the wireless power transmission apparatus and the power receiver.

BRIEF DESCRIPTION OF THE DRAWINGS

The above and/or other aspects will become apparent and more readily appreciated from the following description of example embodiments, taken in conjunction with the accompanying drawings of which:

FIG. 1 is a view illustrating a display system according to an example embodiment and a driving state thereof;

FIG. 4 is a view illustrating a state after the display apparatus of FIG. 3 is turned on;

FIG. 6 is a side view illustrating a display apparatus according to another example embodiment;

DETAILED DESCRIPTION

Figure 2:
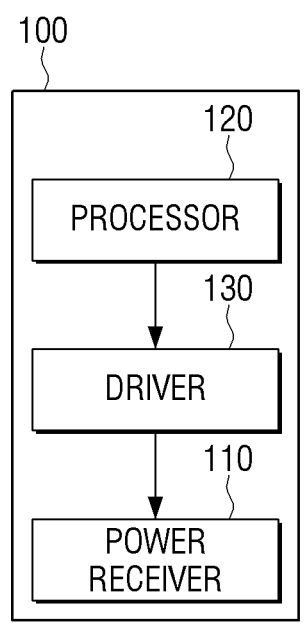
FIG. 2 is a block diagram illustrating a display apparatus according to an example embodiment.

Hereinafter, certain example embodiments will be described in detail with reference to the accompanying drawings.

The example embodiments may be diversely modified. Accordingly, specific example embodiments are illustrated in the drawings and are described in detail in the detailed description. However, it is to be understood that the present disclosure is not limited to a specific example embodiment, but includes all modifications, equivalents, and substitutions without departing from the scope and spirit of the present disclosure. Also, well-known functions or constructions are not described in detail since they would obscure the disclosure with unnecessary detail. Throughout the drawings, like reference numerals will be understood to refer to like parts, components and structures.

The terms "first", "second", etc. may be used to describe diverse components, but the components are not limited by the terms.

The terms are only used to distinguish one component from the others. For example, without departing from the scope of the present disclosure, the first component may be referred to as a second component, and similarly, the second component may also be referred to as a first component.

The terms used in the present disclosure may be interpreted as commonly known to those skilled in the art unless otherwise defined.

Also, well-known functions or constructions are omitted to provide a clear and concise description of the example embodiments. Further, dimensions of various elements in the accompanying drawings may be arbitrarily increased or decreased for assisting in a comprehensive understanding.

FIG. 1 is a view for explaining a configuration of a display system according to an example embodiment and a driving state thereof.

Referring to FIG. 1, a display system 1000 may include a display apparatus 100 and a wireless power transmission apparatus 200.

For convenience of explanation, in the present example embodiment, the display apparatus 100 uses a fixed wall-mounted television (TV) as an example. However, the present disclosure is not limited thereto, and the display apparatus 100 may include a stand-type TV, a rotating wall-mounted TV, etc. In addition, the display apparatus 100 may include a digital signage, a video wall, a large display panel, a kiosk, and a computer monitor. Alternately, the present disclosure may be applied to general electronic apparatuses having no display unit, for example, a watch, an air conditioner, a speaker, and the like. Example embodiments applied to these various products will not be illustrated and described.

Referring to FIG. 1, the display apparatus 100 may include a main body 10 and a power receiver 110. The main body 10 accommodates various internal configuration elements.

The wireless power transmission apparatus 200 is a device for supplying power to the display apparatus 100 in a wireless manner. The wireless power transmission apparatus 200 may alternatively be referred to as a source device.

The wireless power transmission apparatus 200 is electrically connected to an outlet that supplies power to the room using a separate electric wire. Inside of the wireless power transmission apparatus 200, a power transmission coil 210 (see FIG. 4) that constitutes a transmission resonator is disposed, and the power transmission coil 210 converts a current that enters the wireless power transmission apparatus 200 through an external power source into a magnetic field. The magnetic field generated in the power transmission coil 210 is emitted and forms a magnetic coupling or a magnetic resonance coupling with the power receiver 110 provided in the display apparatus 100.

FIG. 1 illustrates that the wireless power transmission apparatus 200 is disposed under the main body 10 of the display apparatus 100. However, the position of the wireless power transmission apparatus 200 is not limited thereto, and the wireless power transmission apparatus 200 may be disposed on the left side, the right side, or the upper side of the main body 10.

When being turned on, the wireless power transmission apparatus 200 causes a current to flow through the power transmission coil 210, thereby generating a magnetic field. The generated magnetic field induces a current by passing through a coil inside the power receiver 110 included in the display apparatus 100. The display apparatus 100 may receive power by this wireless power transmission manner. The power receiver 110 may alternatively be referred to as a target device.

The power receiver 110 may be movably connected to the main body 10. In FIG. 1, the power receiver 110 is coupled to the main body 10 through connection lines 131a and 131b. Although the two connection lines 131a and 131b are illustrated in FIG. 1, the number, the arrangement positions, and the like of the connection lines 131a and 131b are not limited thereto. For example, the power receiver 110 and the main body 10 may be connected through a single thick connection line. The connection lines 131a and 131b may include wires for providing the power received from the power receiver 110 to the main body 10.

Since the wireless power transmission apparatus 200 provides power through the power receiver 110, the wireless power transmission apparatus 200 may be disposed at a position corresponding to the power receiver 110, that is, at a position that is on a lower side of and spaced apart from the main body 10. If the power receiver 110 is coupled to the upper side, the left side, or the right side of the main body 10, the wireless power transmission apparatus 200 may be disposed on the upper side, the left side, or the right side of the main body 10.

The display apparatus 100 places the power receiver 110 on main body 10 when the display apparatus 100 is in the inactivated state, that is, when the display apparatus 100 is turned off and in a standby state. In this case, the distance between the power receiver 110 and the wireless power transmission apparatus 200 becomes d1.

When the display apparatus 100 is turned on, the display apparatus 100 moves the power receiver 110 toward the wireless power transmission apparatus 200, that is, in a y2 direction. Accordingly, the distance between the power receiver 110 and the wireless power transmission apparatus 200 is decreased from d1 to d2. Thus, the wireless power transmission efficiency may be improved.

When the display apparatus 100 is turned off in this state, the display apparatus 100 moves the power receiver 110 in the direction of the main body 10, that is, a y1 direction. Accordingly, the distance between the power receiver 110 and the wireless power transmission apparatus 200 is further distanced by d1.

According to an example embodiment, the display apparatus 100 receives the power by moving the power receiver 110 in the y2 direction of the wireless power transmission apparatus 200 while the display apparatus 100 is turned on and operates. Accordingly, even when the display apparatus 100 is spaced apart from the wireless power transmission apparatus 200 by a certain distance, the wireless power transmission may be effectively performed. On the other hand, in the standby state, the display apparatus 100 may move the power receiver 110 close to the main body 10, thereby improving the aesthetics.

In FIG. 1, the power receiver 110 is disposed on the outside of the main body 10 and in contact with the one side surface of the main body 10; however, the present disclosure is not limited thereto. The power receiver 110 may be configured to be inserted in the main body 10 and protrude to the outside when the power receiver 110 is used. Such an example embodiment will be described in detail later in a following section.

FIG. 2 is a block diagram illustrating a display apparatus 100 according to an example embodiment. According to FIG. 2, the display apparatus 100 may include the power receiver 110, a processor 120, and a driver 130.

The power receiver 110 is a component for receiving power from the wireless power transmission apparatus 200 which is located outside the display apparatus 100. The power receiver 110 may be inserted into the main body 10 of the display apparatus 100 or may be coupled to the outside of the main body 10, and may move outward under the control of the processor 120.

The driver 130 is a component for moving the power receiver 110 with respect to the main body 10. The driver 130 may move the power receiver 110 using a motor, a bobbin or the like. The detailed structure of the driver 130 will be described later in detail.

The processor 120 may control the operation of the display apparatus 100 as a whole. For example, when the display apparatus 100 is turned on, the processor 120 may operate the display apparatus 100 using the power received through the power receiver 110.

When the display apparatus 100 is turned off and in the standby state, the processor 120 may control the driver 130 such that the power receiver 110 is positioned on the main body side of the display apparatus 100. Conversely, when the display apparatus 100 is in the turn-on state, the processor 120 may control the driver 130 so that the driver 130 causes the power receiver 110 to move away from the main body 10 in the y2 direction of the wireless power transmission apparatus 200 and to maintain the moved state.

On the other hand, when the display apparatus 100 is a TV, the display apparatus 100 may include components for receiving and processing a TV signal. Also, according to another example embodiment, the display apparatus 100 may measure the distance to the wireless power transmission apparatus 200 and calculate a moving distance of the power receiver 110 based on the measurement result. In addition, when the standby state continues for a long period of time, a spare battery may be used to supply power to move the power receiver 110 toward the wireless power transmission apparatus 200.

Figure 3:
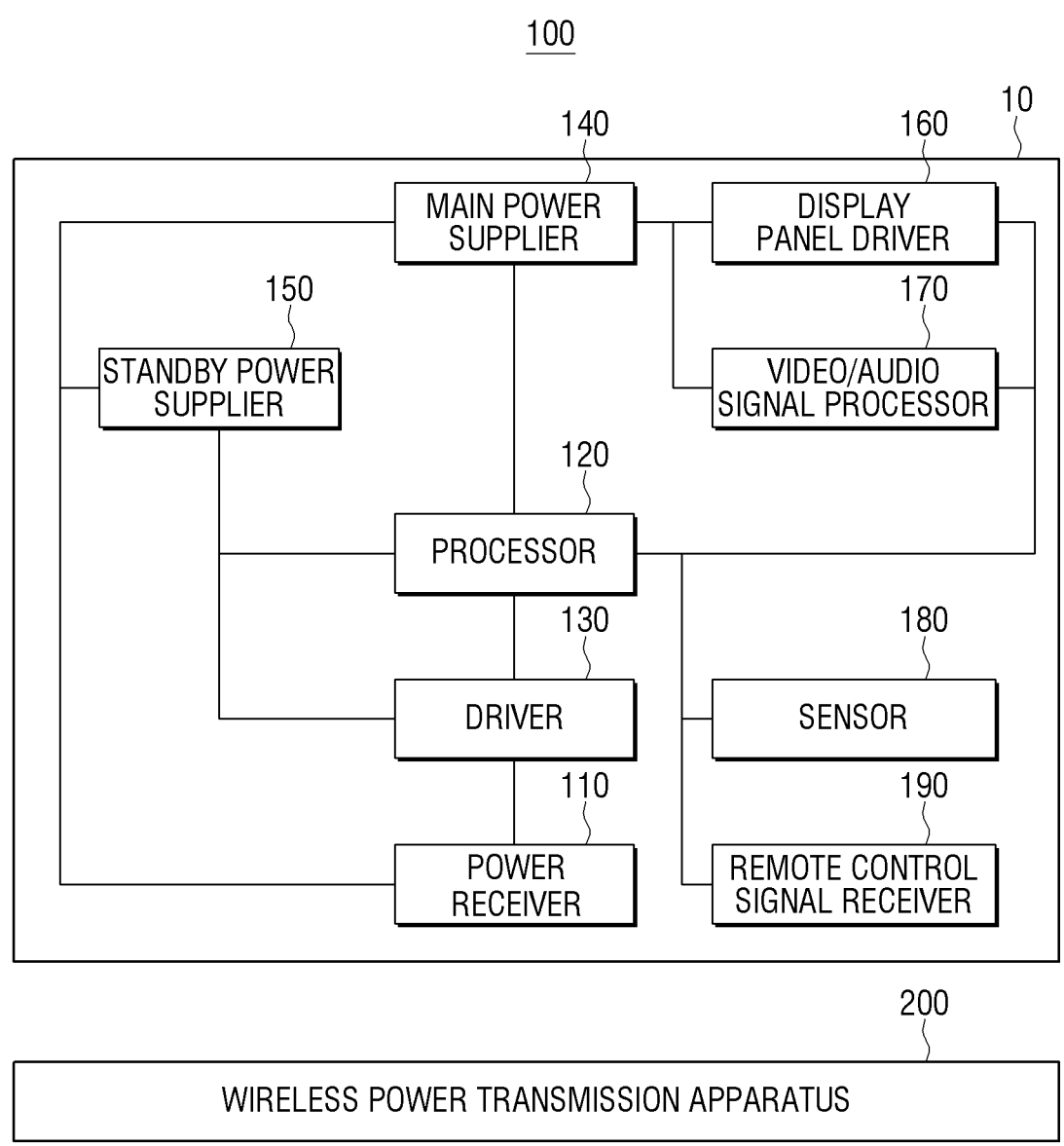
FIG. 3 is a block diagram illustrating an example of the internal configuration of a display apparatus in a standby state.

FIG. 3 is a block diagram illustrating an example of a configuration of a display apparatus according to this example embodiment. According to FIG. 3, the display apparatus 100 may include a power receiver 110, a processor 120, a driver 130, a main power supplier 140, a standby power supplier 150, a display panel driver 160, a video/audio signal processor 170, a sensor 180, and a remote control signal receiver 190.

The power receiver 110 receives power in a wireless power transmission manner from the wireless power transmission apparatus 200, and transmits the power to the main power supplier 140 and the standby power supplier 150.

The power receiver 110 is connected to the main body 10 by a plurality of connection lines 131a and 131b. The power receiver 110 may be moved toward the wireless power transmission apparatus 200 by unwinding or winding the plurality of connection lines 131a and 131b.

The processor 120 may control the driver 130, the display panel driver 160, and the video/audio signal processor 170 based on the signals input from the remote control signal receiver 190 or a control panel.

In the case in which the display apparatus 100 is in the standby state, when the turn-on signal is input through the remote control signal receiver 190, the processor 120 causes the power receiver 110 to move toward the wireless power transmission apparatus 200 by controlling the driver 130. In addition, the processor 120 activates the video/audio signal processor 170 to process the video data and the audio data included in the content received from the contents source, respectively. Although not illustrated in FIG. 3, the display apparatus 100 may further include an antenna signal receiving module for receiving satellite broadcasting, an interface for receiving cable broadcasting, an HDMI for receiving signals from various external devices, and the like. The video/audio signal processor 170 may process various contents received through these interfaces.

Figure 5A:
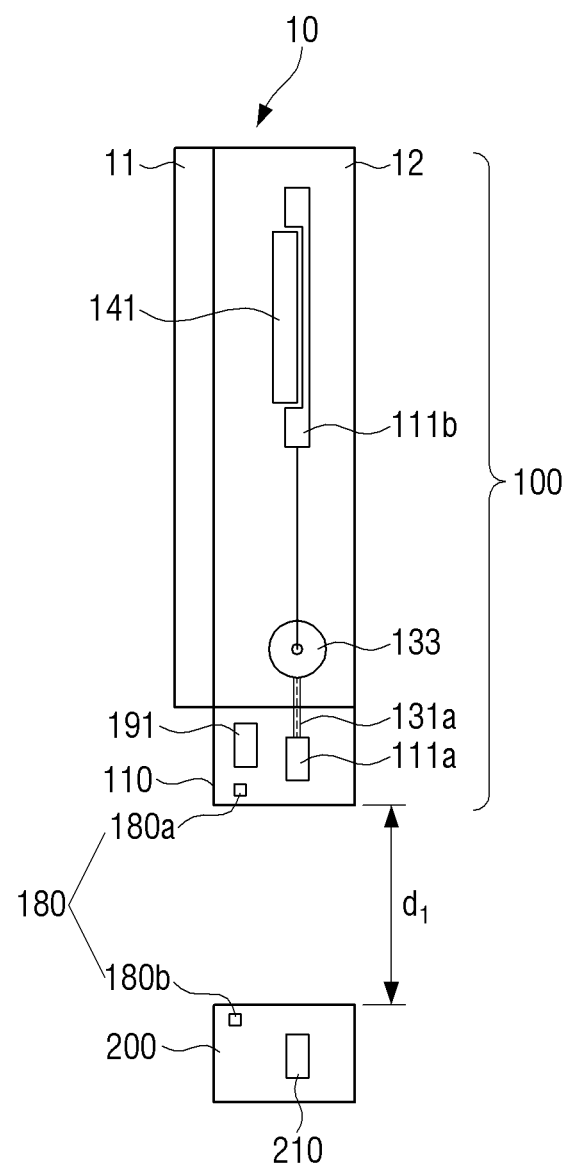
FIG. 5A is a side view illustrating a display apparatus in a standby state.

The display panel driver 160 receives the video signal processed by the video/audio signal processor 170 and outputs the video signal to the display panel 11 (see FIG. 5A).

On the other hand, when the display apparatus 100 is in the turn-on state and the turn-off signal is input, the processor 120 controls the driver 130 to move the power receiver 110 to the main body 10.

The main power supplier 140 is a component for converting power supplied from the wireless power transmission apparatus 200 into driving voltages of respective components inside the display apparatus 100 and supplying the driving voltages to the respective components.

The main power supplier 140 may include a battery capable of storing power transmitted from the power receiver 110.

When the display apparatus 100 is in the standby state, no power is transmitted from the power receiver 110 to the main power supplier 140, so that the main power supplier 140 supplies the power stored in the battery to the processor 120 and the driver 130.

The standby power supplier 150 refers to a power supply separately provided from the main power supplier 140. The standby power supplier 150 may supply power to some components such as the processor 120, the driver 130, the sensor 180, the remote control signal receiver 190, and the like in the standby state. Also, the standby power supplier 150 may supplement the power when the main power supplier 140 is discharged at a predetermined rate or more.

The standby power supplier 150 may be electrically connected to the power receiver 110 and may be charged by the power supplied from the wireless power transmission apparatus 200; however, the standby power supplier 150 is not limited thereto. The standby power supplier 150 may be implemented as a primary battery.

The sensor 180 is a component for measuring the distance between the power receiver 110 and the wireless power transmission apparatus 200. When the distance is measured using the sensor 180, the processor 120 compares the distance with a predetermined distance range. The predetermined distance range refers to a distance range in which the wireless power transmission apparatus 200 can efficiently transmit the wireless power to the power receiver 110. The processor 120 may control the driver 130 to move the power receiver 110 until the distance between the power receiver 110 and the wireless power transmission apparatus 200 is within the predetermined distance range. As a result, regardless of how much the user of the display apparatus 100 separates the wireless power transmission apparatus 200 away from the display apparatus 100, the display apparatus 100 may be supplied with power in the optimum condition.

The sensor 180 may be implemented by various sensors such as an infrared sensor, an ultrasonic sensor, a laser sensor, or the like. The sensor 180 may be disposed in the power receiver 110 and the wireless power transmission apparatus 200, respectively. However, the disposing position of the sensor 180 is not limited thereto, and the sensor 180 may be disposed inside the main body 10 or at a place other than the main body 10.

The driver 130 moves the power receiver 110 in the y2 direction of the wireless power transmission apparatus 200 or the y1 direction of the main body 10 according to the control of the processor 120 (see FIG. 1).

The remote control signal receiver 190 is a component for receiving a remote control signal. The remote control signal receiver 190 may be included in the display apparatus 100, but may also be included in the wireless power transmission apparatus 200. When the remote control signal receiver 190 is included in the wireless power transmission apparatus 200, the wireless power transmission apparatus 200 may be activated immediately after the turn-on signal is input, and transmit power.

The remote control signal receiver 190 may be implemented as an infrared ray (IR) receiving module; however, the present disclosure is not limited thereto. The remote control signal receiver 190 may transmit or receive a signal using a Wi-Fi, Bluetooth, Near Field Communication (NFC), iBeacon, or Bluetooth Low Energy (BLE).

On the other hand, the main body 10 may be provided with a control panel in addition to the remote control signal receiver 190. The user may directly input the standby signal or the turn-on signal using the control panel provided in the main body 10 without using the remote controller.

In FIG. 3, each of the components 110 to 190 is disposed inside the main body 10. However, the respective components 110 to 190 may be disposed inside or outside the main body 10 by various design modifications, and are not limited to the arrangement illustrated in FIG. 3.

Figure 4:
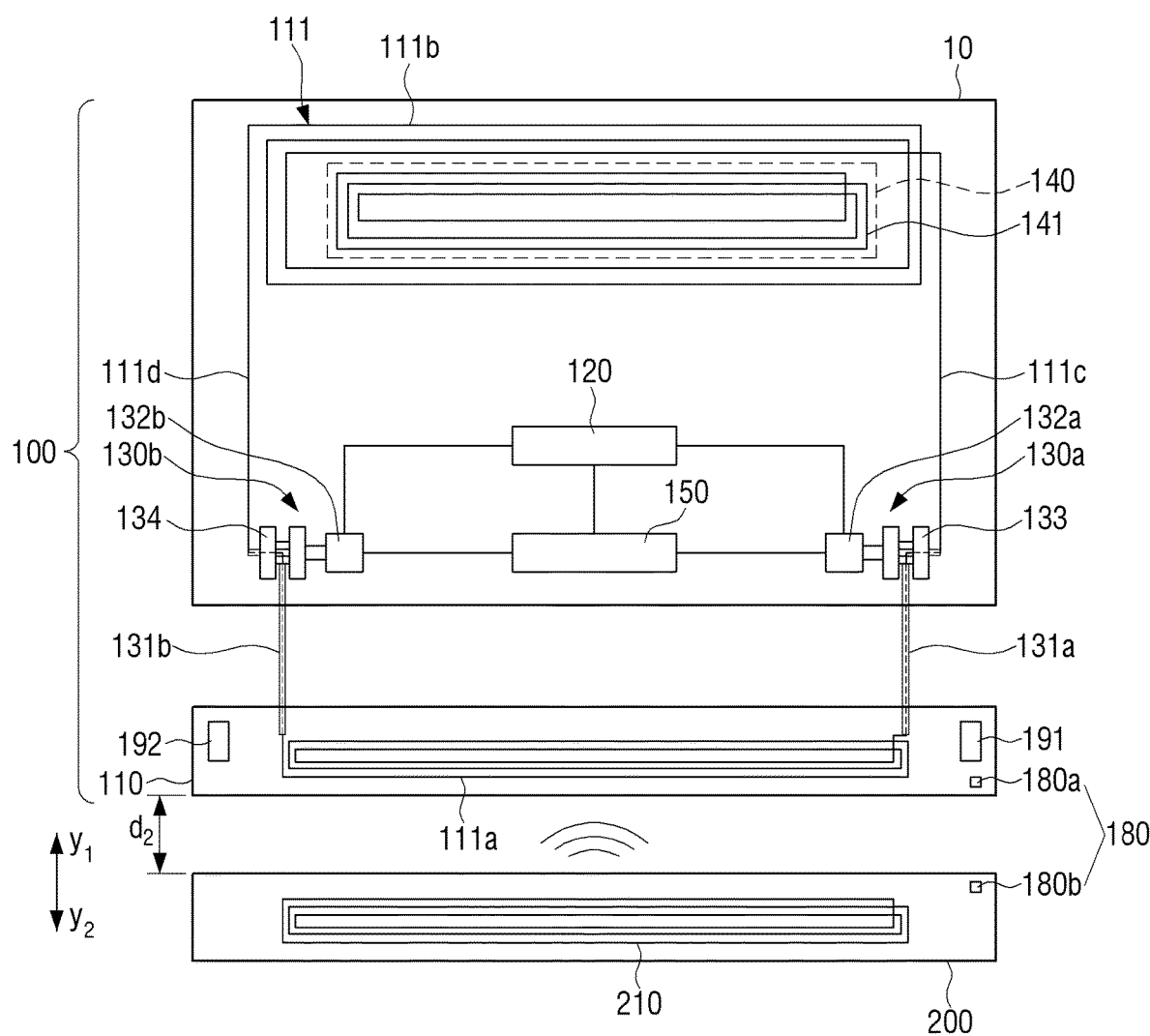

FIG. 4 is a view for explaining internal configuration and operation of the power receiver 110 for wirelessly receiving power.

FIG. 4 is a view illustrating a structure of the display apparatus 100 in turn-on state. Hereinafter, the power receiver 110 and the sensor 180 are disposed outside the main body 10 as an example.

A first power receiving coil 111 is disposed inside the power receiver 110 and the main body 10. A first winding part 111a which is a part of the first power receiving coil 111 is disposed inside the power receiver 110, and a second winding part 111b which is another part of the first power receiving coil 111 is disposed inside the main body 10.

However, the first winding part 111a and the second winding part 111b of the first power receiving coil 111 are not separated but are integrally connected by at least two coil wires 111c and 111d.

When being in the turn-on state, the display apparatus 100 moves the power receiver 110 closer to the wireless power transmission apparatus 200. Thus, the first winding part 111a induces a current from the wireless power transmission apparatus 200. The induced current is transmitted to the second winding part 111b inside the main body 10 through the connection lines 131a and 131b. The second winding part 111b generates a magnetic field by the transmitted current.

The main power supplier 140 includes a second power receiving coil 141. In the second power receiving coil 141, a current is generated by the magnetic field generated in the second winding part 111b. The main power supplier 140 charges the internal battery using the generated current, and utilizes the generated current as driving power for the display apparatus 100.

According to another example embodiment, electricity generated in the first winding part 111a may be directly supplied to the battery in the main power supplier 140 without using the second winding part 111b and the second power receiving coil 141. Alternatively, the power receiver 110 may include a power receiving coil and a transformer coil and directly generate a driving voltage required for display apparatus 100.

The display apparatus 100 may be provided with at least one driver 130. The driver 130 moves the power receiver 110 by a single connection line. However, when the display apparatus 100 is larger, the size of the power receiver 110 also increases. Therefore, moving the power receiver 110 by only the single driver 130 and the single connection line may destabilize the center of gravity of the power receiver 110, the single connection line or the display apparatus 100.

Accordingly, the display apparatus 100 may be provided with at least two drivers 130a and 130b which are disposed to be symmetrical in the width direction of the display apparatus 100.

Hereinafter, a display apparatus 100 including two drivers 130a and 130b will be described as an example.

As illustrated in FIG. 4, when the power receiver 110 is connected through the two connection lines 131a and 131b, the driver 130 may include two parts 130a and 130b corresponding to the connection lines 131a and 131b. Each of the drivers 130a and 130b includes a bobbin 133 and 134 and a motor 132a and 132b.

The two drivers 130a and 130b include a plurality of connection lines 131a and 131b connected to the coil wires 111c and 111d, a plurality of bobbins 133 and 134 connected to the plurality of connection lines 131a and 131b, and a motor 132 for winding or unwinding the plurality of connection lines 131a and 131b on the plurality of bobbins 133 and 134 by rotating the plurality of bobbins in the clockwise direction or in the counter-clockwise direction.

The number of the motor 132 may be one. In this case, the plurality of bobbins 133 and 134 may be provided at opposite ends of a single rotating shaft passing through the motor 132, and may simultaneously rotate in the same direction.

The number of the motor 132 may be two or more. When two motors 132a and 132b are used, each of the plurality of bobbins 133 and 134 may be provided at the rotating shaft of the respective motors 132a and 132b. The operation of the two motors 132a and 132b may be synchronized so that the bobbins 133 and 134 are simultaneously rotated in the same direction.

Hereinafter, the case where the driver 130 includes two motors 132a and 132b will be described as an example.

The plurality of motors 132a and 132b rotate in the clockwise direction or in the counter-clockwise direction according to the control of the processor 120, respectively. The plurality of motors 132a and 132b may be driven by the power supplied from the main power supplier 140. According to another example embodiment, the plurality of motors 132a and 132b may be connected to the standby power supplier 150, so that when the power is not supplied from the main power supplier 140, the motors 132a and 132b are driven by the power supplied from the standby power supplier 150.

The plurality of connection lines 131a and 131b may be implemented such that a portion or the whole of each of the coil wires 111c and 111d are surrounded by an insulating sheath. Accordingly, when the coil wires 111c and 111d are connected to the plurality of bobbins 133 and 134, the coil wires 111c and 111d may be insulated from the plurality of bobbins 133 and 134, and the coil wires 111c and 111d may be prevented from being broken by being twisted while the coil wires 111c and 111d are wound on or unwound from the plurality of bobbins 133 and 134.

In addition, when the power receiver 110 moves in the y2 direction of the wireless power transmission apparatus 200, a portion of each of the coil wires 111c and 111d is exposed to the outside. The coil wires 111c and 111d extending from the plurality of bobbins 133 and 134 to the first winding part 111a may be surrounded in cloth, so that a portion of each of the coil wires 111c and 111d is not exposed to the outside and maintains the insulation.

On the other hand, the power receiver 110 may be provided with at least one speaker 191 and 192. Also, the power receiver 110 may include one sensor 180a. In order to more accurately measure the distance between the power receiver 110 and the wireless power transmission apparatus 200, the wireless power transmission apparatus 200 may include an additional sensor 180b.

Figure 5B:
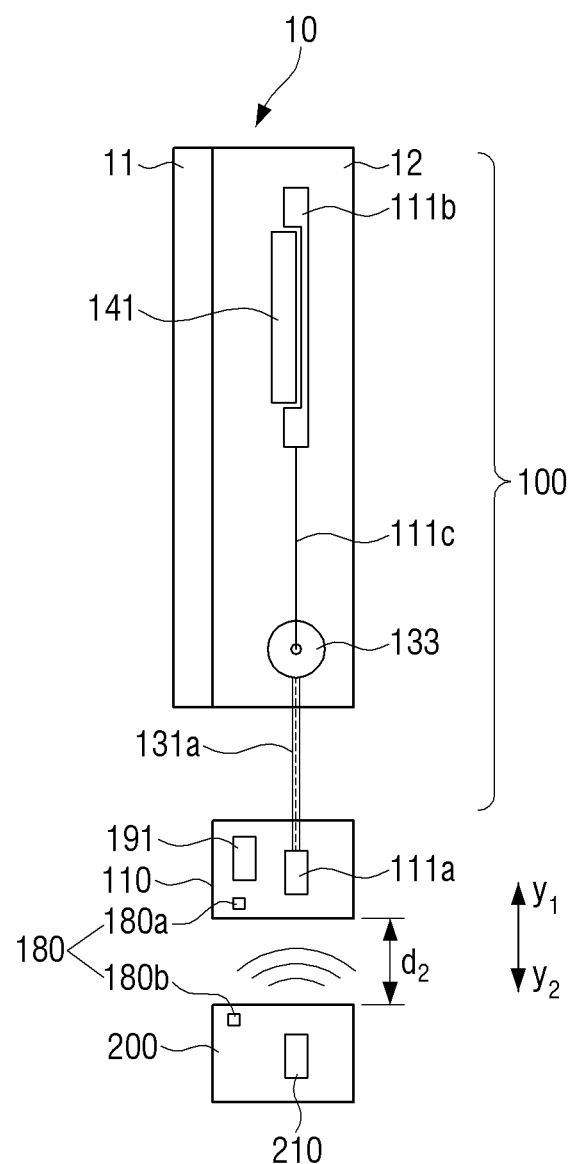
FIG. 5B is a side view illustrating a display apparatus in a turn-on state.

FIGS. 5A and 5B are views illustrating a side structure of a display apparatus. FIG. 5A shows a standby state, and FIG. 5B shows a turn-on state.

As illustrated in FIG. 5A, the main body 10 may include a display panel 11 and a housing 12 connected to one surface of the display panel 11.

The housing 12 may accommodate the processor 120, the driver 130, the main power supplier 140, the standby power supplier 150, the display panel driver 160, the video/audio signal processor 170, and the remote control signal receiver 190.

The second winding part 111b provided inside the display apparatus 100 is separated by a predetermined distance from and wirelessly supplies power to the second power receiving coil 141 of the main power supplier 140.

Referring to FIGS. 5A and 5B, the power receiver 110 may be provided separately below the display apparatus 100, and may be moved close to or away from the main body 10. However, according to another example embodiment, the power receiver 110 may be inserted into the main body 10, and may be invisible to the user in the standby state.

Figure 7:
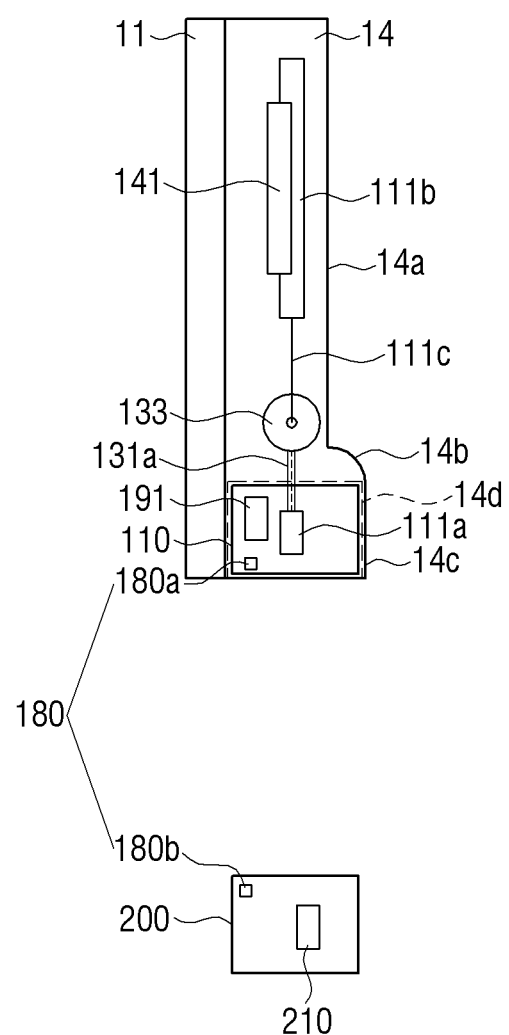
FIG. 7 a side view illustrating a display apparatus according to another example embodiment.
Figure 8:
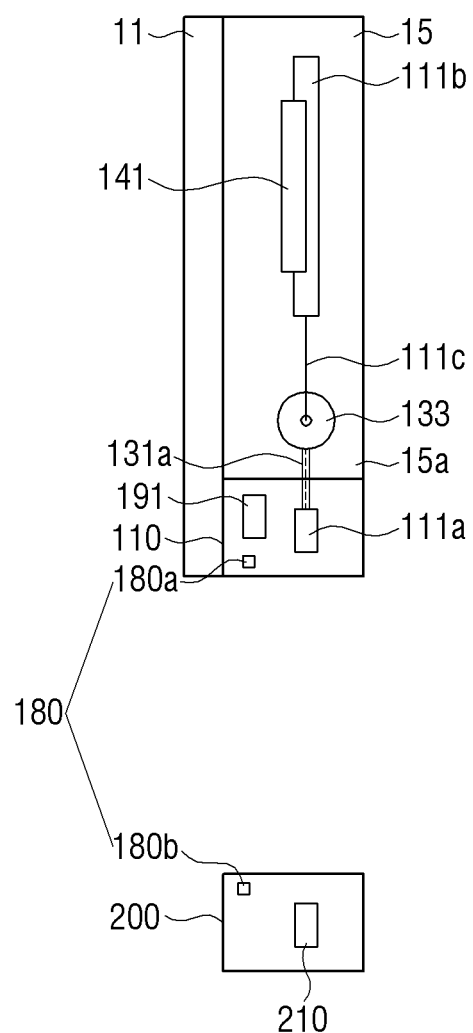
FIG. 8 is a side view illustrating a display apparatus according to another example embodiment.

FIGS. 6 to 8 are side views illustrating a display apparatus according to various example embodiments. FIGS. 6 to 8 illustrate a state in which the second winding part 111b is directly connected to the second power receiving coil 141.

According to the example embodiment illustrated in FIG. 6, a housing 13 includes a predetermined space 13a formed in a lower portion of the housing 13 to accommodate the power receiver 110 inside the housing 13.

When the display apparatus 100 is in the standby state, the power receiver 110 is accommodated in the housing 13, and the power receiver 110 cannot be observed from the outside. When the display apparatus 100 is turned on, the power receiver 110 protrudes outside the housing 13 and moves in the y2 direction of the wireless power transmission apparatus 200. Therefore, the user can observe the power receiver 110 from the outside when the display apparatus 100 is turned on.

Referring to FIG. 7, a housing 14 of the display apparatus according to another example embodiment is coupled with the display panel 11 at the rear of the display panel 11.

At this time, the second winding part 111b may be directly electrically connected to the second power receiving coil 141. In this case, since a separate space is not required between the second winding part 111b and the main power supplier 140, the main body 10 may be made slimmer.

On the other hand, an empty space 14d may be formed in a portion 14c of the housing 14 where the power receiver 110 is accommodated. At this time, the size of the power receiver 110 is determined according to the size and the number of windings of the power transmission coil 210 formed in the wireless power transmission apparatus 200. When the wireless power transmission apparatus 200 is configured to transmit a large amount of power, the size of the first winding part 111a disposed in the power receiver 110 also increases in proportion thereto, so that the size of the power receiver 110 is proportional to the wireless power transmission apparatus 200. Therefore, the size of the power receiver 110 of the display apparatus 100 according to this example embodiment may be the same as that of the power receiver 110 according to an example embodiment as described above. Accordingly, since the size of the space 14d in which the power receiver 110 is disposed is not reduced, the housing 14 may be formed so that the portion 14c in which the power receiver 110 is accommodated is projecting convexly and the other portion 14a of the housing 14 is flat.

A portion 14b connecting the portion 14c in which the power receiver 110 is received and the portion 14a may be formed in a curved shape with a predetermined curvature in consideration of the external appearance of the display apparatus 100. However, the shape of the connecting portion 14b is not limited to any particular shape, and may be variously formed by design changes.

As illustrated in FIG. 7, the portion 14c in which the power receiver 110 is received is formed in the lower portion of the display apparatus 100, and the portion 14b connecting the portion 14c receiving the power receiver 110 and the portion 14a is formed in the curved shape.

FIG. 8 illustrates a housing 15 of a display apparatus 100 according to another example embodiment. Referring to FIG. 8, the housing 15 may have a different area than the display panel 11. In this case, one end 15a of the housing 15 is not extended to one end of the display panel 11.

The one end 15a of the housing 15 is extended to form a space where the power receiver 110 can be covered by the display panel 11 behind the display panel 11.

In this case, when the display apparatus 100 is in the standby state, the power receiver 110 is not positioned inside the housing 15, but is in contact with the one end 15a of the housing 15. Therefore, the display apparatus 100 according to the present example embodiment may give the user a feeling and aesthetic sense similar to the above-described example embodiments in which the power receiver 110 is received inside the housing 13 and 14.

In addition, since the power receiver 110 is not housed in the housing 15, the thickness of the housing 15 may be minimized by design change, so that the display apparatus 100 may be made slimmer.

Figure 9:
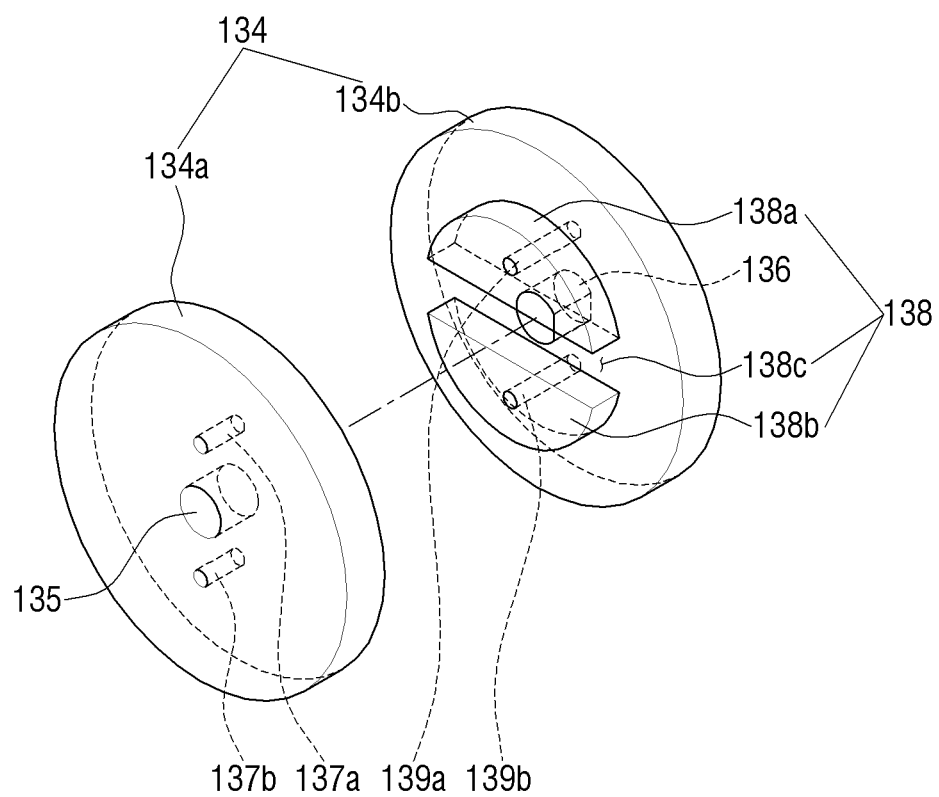
FIG. 9 is an exploded perspective view illustrating a bobbin according to an example embodiment.
Figure 10:
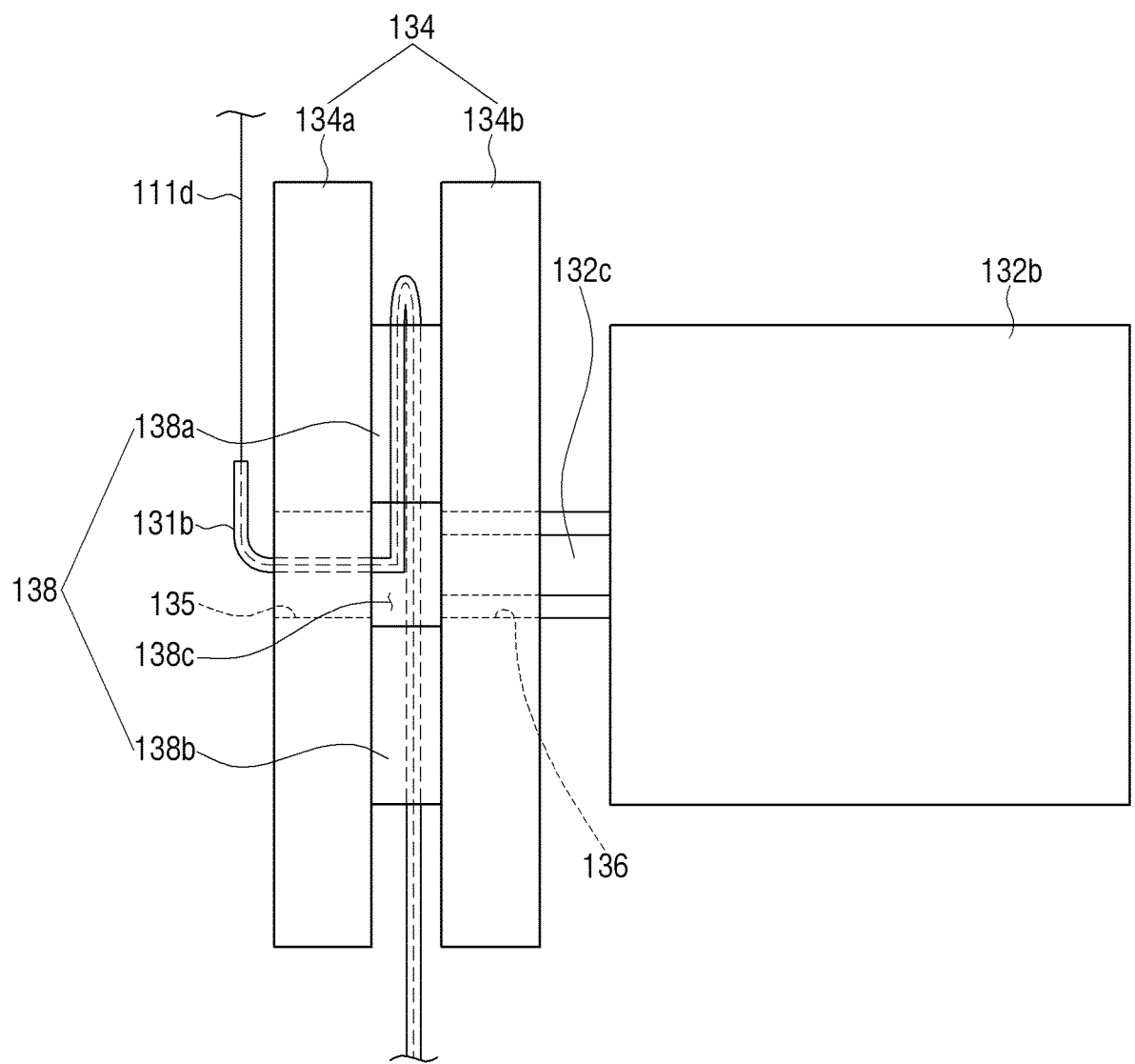
FIG. 10 is a view illustrating a drive unit according to an example embodiment.

Hereinafter, a bobbin and a driver according to an example embodiment will be described with reference to FIGS. 9 and 10. FIG. 9 is an exploded perspective view illustrating a bobbin according to an example embodiment, and FIG. 10 is a view illustrating a driver according to an example embodiment.

Since the pair of bobbins 133 and 134 according to an example embodiment have the same configuration and are disposed symmetrically with respect to each other, only one bobbin 134 of the pair of bobbins 133 and 134 will be described.

Referring to FIG. 9, the bobbin 134 includes a plate 134a provided with a through hole 135 and a base 134b provided with a guide groove 138c to guide the connection line 131b.

The bobbin 134 is connected to the connection line 131b wrapping the coil wire 111d. The connection line 131b may be wound on or unwound from a drum 138 of the bobbin 134. In other words, the bobbin 134 may wind or unwind the connection line 131b and the coil wire 111d received inside the connection line 131b.

The through hole 135 penetrating the plate 134a is formed at the center of the plate 134a, and the coil wire 111d and the connection line 131b are positioned in the guide groove 138c through the through hole 135.

The drum 138 is formed on one side surface of the base 134b, and the drum 138 is in contact with the one side surface of the plate 134a. The drum 138 is divided into a first half-drum 138a and a second half drum 138b by the guide groove 138c formed at the middle of the drum 138.

The plate 134a is provided with a plurality of plate side connection holes 137a and 137b, and the base 134b is provided with a plurality of base side connection holes 139a and 139b passing through the first half-drum 138a and the second half drum 138b. In addition, a connection hole 136 to which the rotation shaft 132c of the motor 132b is connected is formed at the center of the base 134b.

The connection hole 136 receives the rotational force from the rotation shaft 132c and causes the base 134b to rotate. Accordingly, the shape of the connection hole 136 may have a shape such as a semicircular shape, a triangle, or a square rather than a circular shape. In this example embodiment, the connection hole 136 has a substantially semicircular shape.

The plate side connection holes 137a and 137b and the base side connection holes 139a and 139b are formed at positions corresponding to each other, and one plate side connection hole 137a and one base side connection hole 139a may be coupled by a screw or a rivet.

The plate 134a and the base 134b are connected with each other by screws or rivets which are fixed to the base side connection holes 139a and 139b through the plate side connection holes 137a and 137b.

However, it is not limited that the plate 134a and the base 134b are connected only by screws or rivets, and they may be connected by various connecting manners such as adhesive bonding.

Referring to FIG. 10, the coil wire 111d and the connection line 131b which have passed through the through hole 135 come out of one end of the guide groove 138c, and then are wound on the first half-drum 138a or the second half drum 138b, thereby being wound on the drum 138.

At this time, since a portion of each of the coil wire 111d and the connection line 131b is fixed to the guide groove 138c, even when the bobbin 134 rotates by the motor 132b, portions of the coil wire 111d and the connection line 131b exposed to the outside of the main body 10 may be wound or unwound without affecting portions of the coil wire 111d and the connection line 131b inside the main body 10.

Also, since the portions of the coil wire 111d and the connection line 131b are fixed to the guide groove 138c, even when the bobbin 134 rotates, the coil wire 111d and the connection line 131b disposed inside the main body 10 are not twisted.

A bobbin 234 according to another example embodiment will be described with reference to FIGS. 11 and 12.

Figure 11:
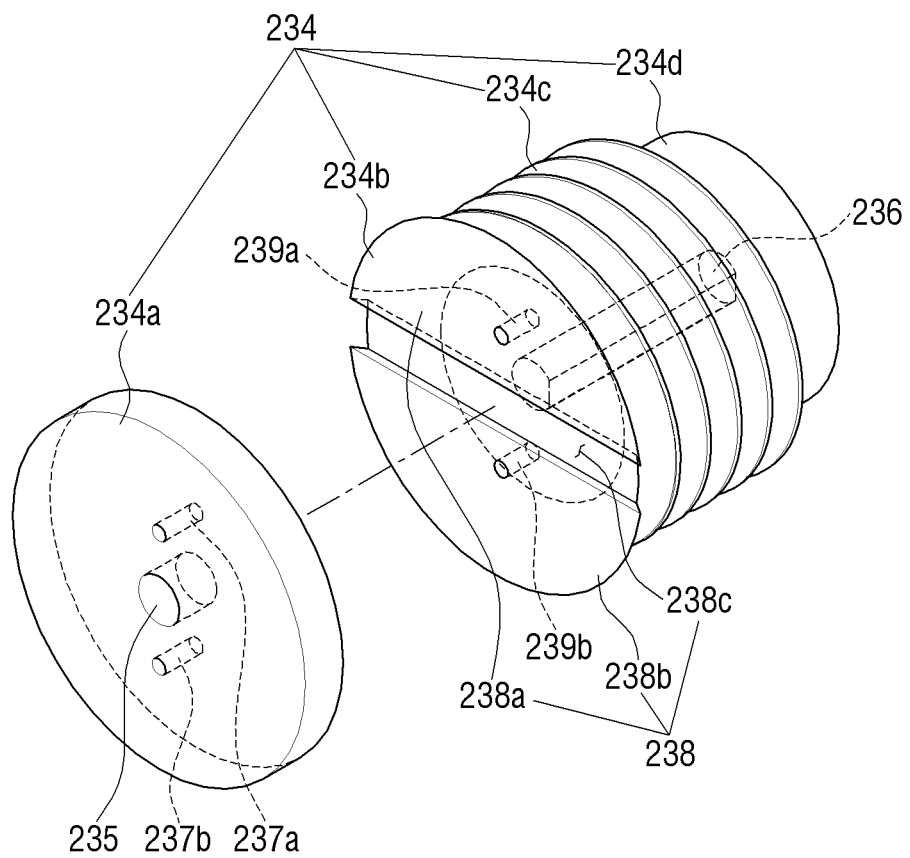
FIG. 11 is an exploded perspective view illustrating a bobbin according to another example embodiment.
Figure 12:
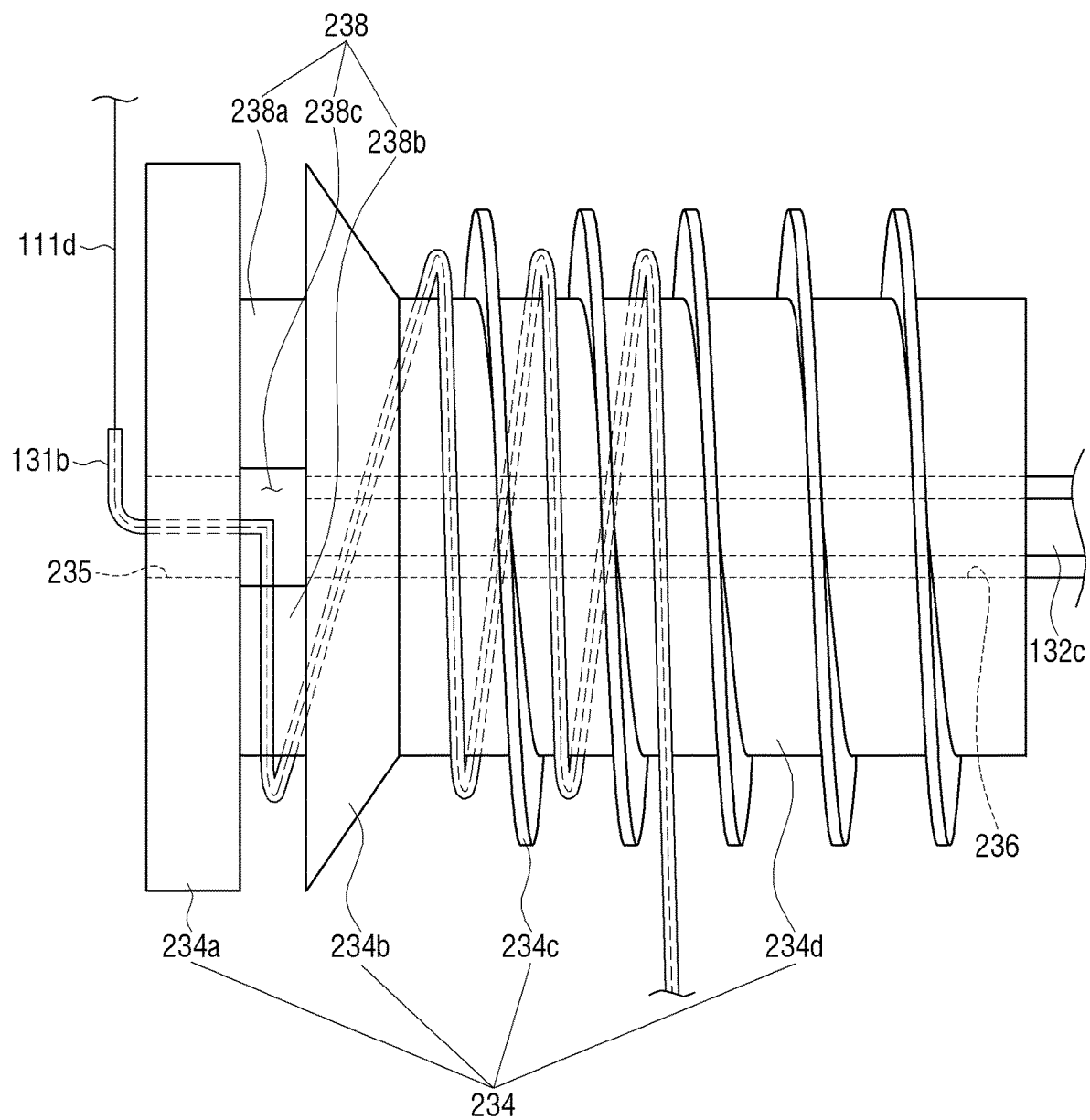
FIG. 12 is a front view illustrating a drive unit according to another example embodiment.

FIG. 11 is an exploded perspective view illustrating a bobbin according to another example embodiment, and FIG. 12 is a view illustrating a drive unit according to another example embodiment.

A bobbin 234 according to another example embodiment may include a plate 234a provided with a through hole 235, a base 234b provided with a guide groove 238c formed on one surface thereof to guide the connection line 131b, a pillar 234d formed on the other surface of the base 234b, and a plurality of threads 234c formed on the surface of the pillar 234d.

The bobbin 234 according to the present example embodiment may wind or unwind the coil wire 111d and the connection line 131b on or from the plurality of threads 234c formed on the surface of the pillar 234d.

The through hole 235 penetrating the plate 234a is formed at the center of the plate 234a and the coil wire 111d and the connection line 131b are extended in the guide groove 238c through the through hole 235.

One surface of the base 234b forms a screw head 238, and the screw head 238 is in contact with one surface of the plate 234a. Also, the screw head 238 is divided into a first half-screw head 238a and a second half screw head 238b by the guide groove 238c formed in the middle of the screw head 238.

The plate 234a is provided with a plurality of plate side connection holes 237a and 237b, and the base 234b is provided with a plurality of base side connection holes 239a and 239b passing through the first half-screw head 238a and the second half screw head 238b. In addition, a connection hole 236 to which the rotation shaft 132c of the motor 132b is connected is formed at the center of the base 234b.

The connection hole 236 receives the rotational force from the rotation shaft 132c and causes the base 234b to rotate. Accordingly, the shape of the connection hole 236 may have a shape such as a semicircular shape, a triangle, or a square rather than a circular shape. In this example embodiment, the connection hole 236 has a substantially semicircular shape as an example.

The plate side connection holes 237a and 237b and the base side connection holes 239a and 239b are formed at positions corresponding to each other, and one plate side connection hole 237a and one base side connection hole 239a may be coupled by a screw or a rivet.

Accordingly, the plate 234a and the base 234b are connected with each other by screws or rivets which are fastened to the base side connection holes 239a and 239b through the plate side connection holes 237a and 237b.

However, it is not limited that the plate 234a and the base 234b are connected only by screws or rivets, and they may be connected by various connecting manners such as adhesive bonding.

Referring to FIG. 12, the coil wire 111d and the connection line 131b which have passed through the through hole 235 come out of one end of the guide groove 238c, and then are guided to be wound on the pillar 234d by the first half-screw head 238a and the second half screw head 238b.

The plurality of threads 234c formed on the surface of the pillar 234d helps the coil wire 111d and the connection line 131b to be sequentially wound on or unwound from the pillar 234d along the plurality of threads 234c.

Since the plurality of threads 234c formed on the surface of the pillar 234d prevents the coil wire 111d and the connection line 131b wound on the pillar 234d from being twisted, the bobbin 234 according to the present example embodiment is less likely to damage and break the coil wire 111d and the connection line 131b than the bobbin 134 according to above-described example embodiment.

In addition, in the case in which a portion of each of the coil wire 111d and the connection line 131b is fixed to the guide groove 238c, even when the bobbin 234 rotates, portions of the coil wire 111d and the connection line 131b exposed to the outside of the main body 10 may be wound or unwound without affecting portions of the coil wire 111d and the connection line 131b inside the main body 10.

Thus, since the portions of the coil wire 111d and the connection line 131b are fixed to the guide groove 238c, even when the bobbin 234 rotates, the coil wire 111d and the connection line 131b disposed inside the main body 10 are not twisted.

On the other hand, although not illustrated here, the display apparatus according to another example embodiment may be configured such that the power receiver 110 is fixed within a predetermined distance range in which the power receiver 110 can effectively receive wireless power from the wireless power transmission apparatus 200, and the main body 10 moves with respect to the power receiver 110.

In this case, the driver 130 may be disposed in the main body 10 or the power receiver 110, and may be implemented by a pneumatic type, a hydraulic type, or an electric type in addition to the motor. The plurality of connection lines 131a and 131b may be implemented by a slider and a bar made of an insulating material or by an adjustable bar. For example, when the plurality of connection lines 131a and 131b is implemented by the adjustable bar, a hydraulic actuator may be generally used to adjust the length of the bar. In addition, various configurations may be used to move the main body 10 of the display apparatus from the power receiver 110.

When the power receiver 110 is fixedly disposed within a predetermined distance range in which the power receiver 110 can effectively receive wireless power from the wireless power transmission apparatus 200, a power supply line connected to the display apparatus 100 from an external power source becomes unnecessary, and the display apparatus 100 may give an aesthetic beauty to the user. Also, the main body 10 may be configured to be capable of rotating, tilting, as well as linearly moving with respect to the power receiver 110. Accordingly, the main body 10 may be arranged in various attitudes according to the attitude and eye level of the viewer, and the viewer may watch the display apparatus 100 according to the present disclosure more comfortably than the conventional display apparatus.

As described above, the display apparatus may receive power effectively from an external wireless power transmission apparatus using a power receiver that is able to move according to circumstances.

Figure 13:
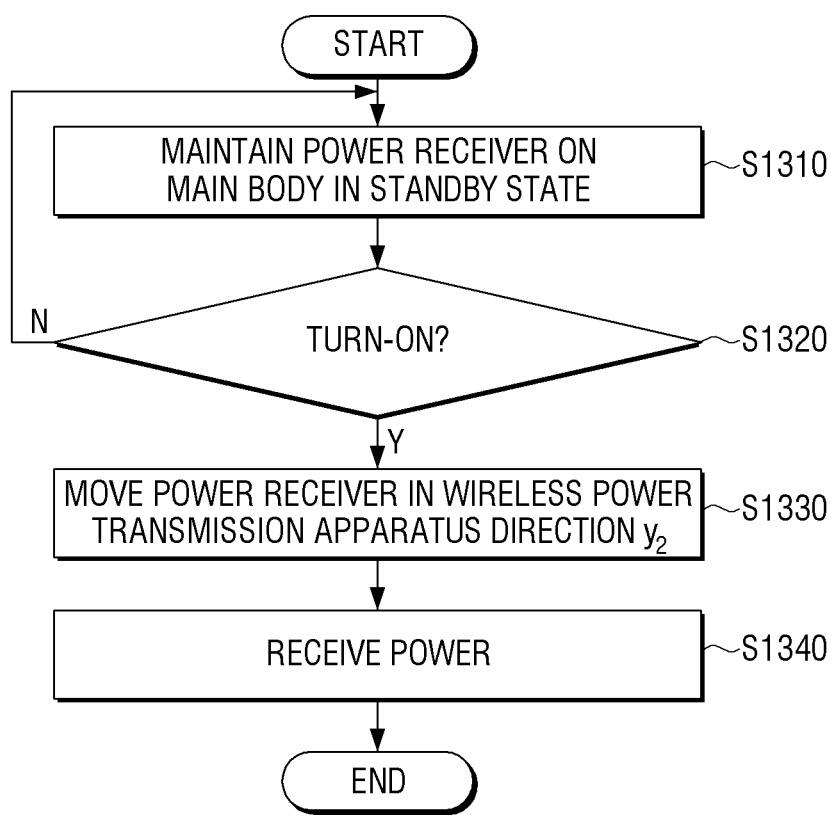
FIG. 13 is a flow chart illustrating a driving method of a display apparatus according to an example embodiment.

FIG. 13 is a flow chart for explaining a driving method of a display apparatus according to an example embodiment. The driving method described in FIG. 13 may be executed in the display apparatus according to above-described various example embodiments, but is not limited thereto. The driving method may be executed in various display apparatuses having a modified configuration.

According to FIG. 13, the display apparatus 100 places the power receiver 110 on the main body 10 in a standby state (S1310). When the display apparatus 100 is turned on in this state (S1320), the display apparatus 100 moves the power receiver 110 in a direction away from the main body 10, that is, in the y2 direction of the wireless power transmission apparatus 200 (S1330). The power receiver 110 receives power from the wireless power transmission apparatus 200 (S1340). The power receiver 110 transmits the power provided from the wireless power transmission apparatus 200 to the main body 10 of the display apparatus 100, and the display apparatus 100 performs the display operation using the power.

On the other hand, as described above, the display apparatus 100 may adaptively control the movement of the power receiver 110 by using the sensor 180 for identifying a distance.

Figure 14:
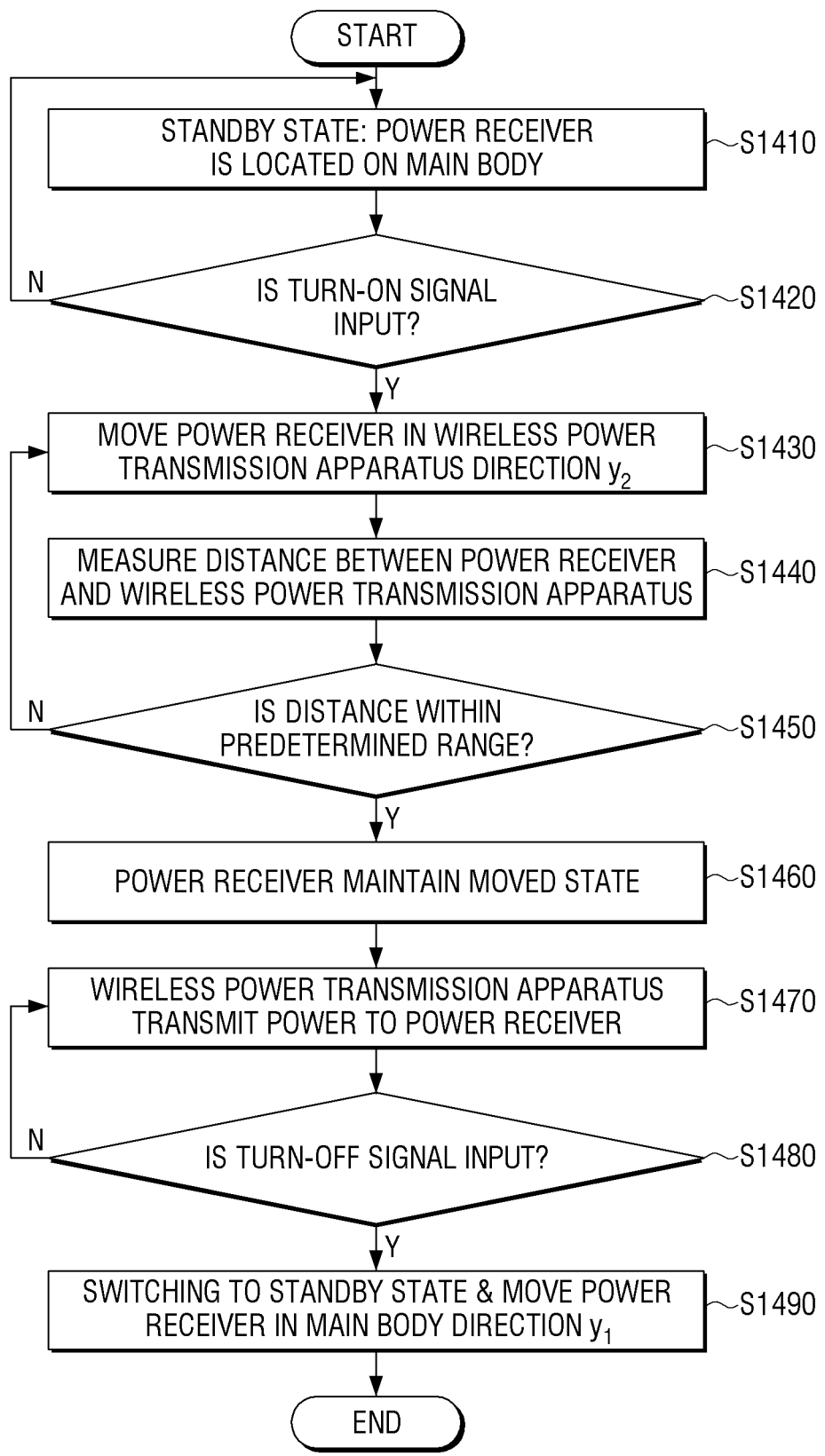
FIG. 14 is a flow chart illustrating a driving method of a display apparatus according to another example embodiment.

FIG. 14 is a flow chart illustrating a driving method of a display apparatus according to another example embodiment.

When the display apparatus 100 is in the standby state, the display apparatus 100 places the power receiver 110 on the main body 10 of the display apparatus 100 (S1410).

The driver 130 winds the connection lines 131a and 131b connecting the power receiver 110 and the main body 10 on the bobbins 133 and 134 as much as possible, and maintains the state.

In this state, when the user inputs a turn-on signal to the display apparatus 100 using a remote controller or a control panel (S1420), the processor 120 controls the driver 130 to unwind the connection lines 131a and 131b from the bobbins 133 and 134.

While the connection lines 131a and 131b are being unwound from the bobbins 133 and 134, the power receiver 110 moves in the y2 direction of the wireless power transmission apparatus 200 (S1430).

The processor 120 moves the power receiver 110 in the y2 direction and measures the distance between the power receiver 110 and the wireless power transmission apparatus 200 using the sensor 180 (S1440).

The processor 120 determines or identifies whether a distance value measured through the sensor 180 is within a predetermined range (S1450).

Here, the predetermined range refers to a distance range over which the wireless power transmission can be most efficiently performed. The manufacturer of the display apparatus 100 may calculate an optimum distance range through preliminary test, and then store the optimum distance range in the display apparatus 100.

When the processor 120 determines or identifies that the distance value is within the predetermined range, the processor 120 controls the driver 130 to stop the connection lines 131a and 131b from being unwound from the bobbins 133 and 134 (S1460). As a result, the state in which the power receiver 110 is moved toward the wireless power transmission apparatus 200 is maintained.

The processor 120 may store the distance value in a memory. The processor 120 may reuse the stored distance value without sensing the distance each time it is turned on. The distance sensing may be performed periodically or when a user command is input.

On the other hand, when the processor 120 determines or identifies that the sensed distance value does not exist within the predetermined range, the processor 120 controls the driver 130 to cause the power receiver 110 to continuously move in the y2 direction. When the power receiver 110 and the wireless power transmission apparatus 200 maintain a distance capable of wireless power transmission, the power receiver 110 may receive power from the wireless power transmission apparatus 200 (S1470).

The power receiver 110 transmits the received power to the main power supplier 140, and then the display apparatus 100 may perform a normal operation. The main power supplier 140 supplies power to the display panel driver 160 and the video/audio signal processor 170 so that the display apparatus 100 may output video and audio.

When the turn-off signal is input in this state (S1480), the processor 120 controls the driver 130 to pull the connection lines 131a and 131b. According to the control, the driver 130 rotates the motors 132a and 132b, thereby winding the connection lines 131a and 131b on the bobbins 133 and 134.

As a result, the power receiver 110 moves toward the main body 10 and is positioned on one side of the main body 10 (S1490).

As described above, the display apparatus 100 according to various example embodiments may supply power from the wireless power transmission apparatus 200 to the main body 10 regardless of the distance between the main body 10 and the wireless power transmission apparatus 200.

With the display apparatus 100 according to the present disclosure, since the wireless power transmission apparatus 200 can be disposed at various positions, a space may be utilized.

In addition, with the display apparatus 100 according to the example embodiments, since the contact terminals and wires exposed to the outside of the display apparatus 100 are minimized, contact failure and a short circuit due to disconnection may be prevented, and the aesthetic felt by the user may be improved due to the simple design.

On the other hand, in various example embodiments as described above, the power receiver 110 may be designed to implement additional functions in addition to the moving function. For example, the power receiver 110 may be provided with speakers 191 and 192. In the conventional display apparatus, a speaker is disposed in the rear side of the display panel. However, according to the present example embodiment, the speaker may be disposed in the power receiver 110. The speaker may be directly driven by the power received by the power receiver 110. Accordingly, the audio signal may be transmitted more effectively in the direction of the user, and the size of the main body 10 of the display apparatus 100 may be reduced.

In the above-described example embodiments, the direction of movement of the power receiver is adjusted depending on whether the display apparatus is turned on or off, but the present disclosure is not limited thereto. For example, the display apparatus according to another example embodiment may automatically adjust the moving direction of the power receiver 110 according to the charged state of the battery inside the main body.

In this example embodiment, the processor 120 may control the driver 130 to cause the power receiver 110 to move in the y1 direction and to maintain the state when the battery included in the main power supplier 140 is charged to a predetermined ratio or more. At this time, the display apparatus 100 may perform a display operation when the power receiver 110 is positioned in the y1 direction. When the processor 120 determined or identifies that the battery is discharged to less than a predetermined ratio, the processor 120 controls the driver 130 to cause the power receiver 110 to move in the y2 direction and charges the battery again.

In this example embodiment, even when the turn-on command is input, if the battery is charged to the predetermined ratio or more, the display apparatus 100 may perform a normal operation immediately without moving the power receiver 110.

On the other hand, according to another example embodiment, peripheral apparatuses other than the display apparatus 100 may receive power together using the wireless power transmission apparatus 200. In this case, one network system including a plurality of apparatuses may be implemented.

Figure 15:
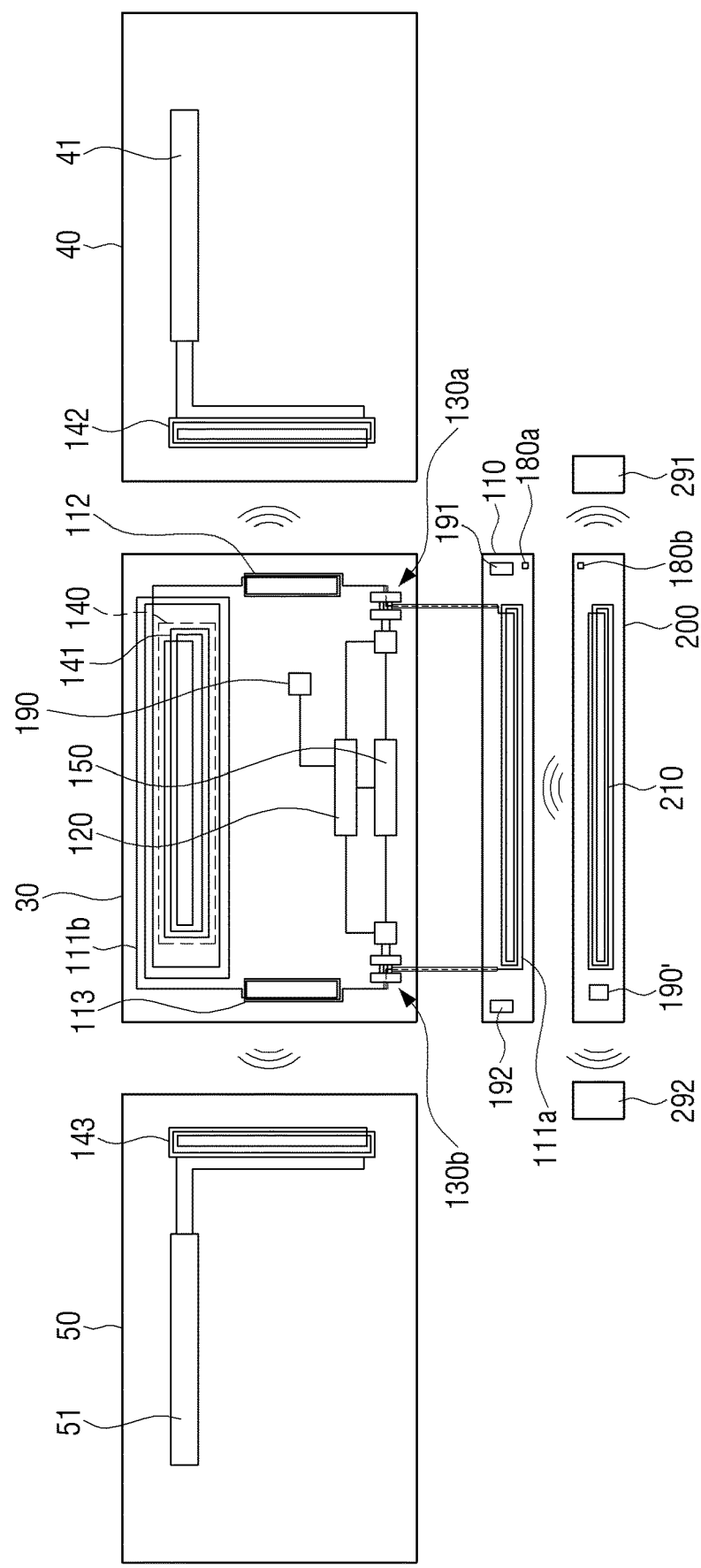
FIG. 15 is a view illustrating a display system according to another example embodiment.

FIG. 15 is a view illustrating a display system 2000 according to this example embodiment.

The display system 2000 according to FIG. 15 may include at least one or more electronic apparatuses 40 and 50 interlocked with a display apparatus 100 using the power transmitted from the wireless power transmission apparatus 200 and separate speakers 291 and 292 using the power transmitted from the wireless power transmission apparatus 200.

FIG. 15 illustrates a state where the power receiver 110 of the display apparatus 100 further includes the speakers 191 and 192.

The wireless power transmission apparatus 200 is provided with an additional remote control signal receiver 190', and a main body 30 of the display apparatus 100 is further provided with third and fourth winding portions 112 and 113 formed at the coil wires 111c and 111d, respectively.

The wireless power transmission apparatus 200 may directly receive a turn-on command or a turn-off command of the user through the additional remote control signal receiver 190'. Accordingly, the wireless power transmission apparatus 200 may operate independently regardless of whether the power receiver 110 disposed in the main body 30 is driven or not.

When the wireless power transmission apparatus 200 wirelessly transmits power, the additional speakers 291 and 292 disposed within a predetermined distance range from the wireless power transmission apparatus 200 may receive power wirelessly without passing through the main body 30 of the display apparatus 100.

The additional speakers 291 and 292 may be connected to the main body 30 of the display apparatus 100 through various wireless communication methods such as Bluetooth, Wi-Fi, ZigBee, etc. or wired interfaces, and output audio signals transmitted from the display apparatus 100. Alternatively, the additional speakers 291 and 292 may output sound sources provided from a separate source.

On the other hand, various electronic apparatuses 40 and 50 provided in addition to the periphery of the display apparatus 100 may be used. In FIG. 15, the additional electronic apparatuses 40 and 50 are illustrated arranged on the left side and the right side of the display apparatus 100. However, the arrangement of the additional electronic apparatuses 40 and 50 is not limited thereto. The additional electronic apparatuses 40 and 50 may be arranged on the upper side and the lower side in addition to the left side and the right side of the display apparatus 100.

The additional electronic apparatuses 40 and 50 are provided with the third power receiving coil 142 and the fourth power receiving coil 143 built-in at positions corresponding to the positions where the third and fourth winding portions 112 and 113 are disposed, respectively.

The third and fourth winding portions 112 and 113 formed on each of the coil wires 111c and 111d receive a current from the first winding part 111a to form a magnetic field in order to wirelessly transmit power to the at least one or more electronic apparatuses 40 and 50 located on both sides of the main body 30.

At this time, the third and fourth power receiving coils 142 and 143 disposed in the additional electronic apparatuses 40 and 50 generate induced currents due to magnetic fields formed in the third and fourth winding portions 112 and 113, and transmit the current to power suppliers 41 and 51 disposed inside the electronic apparatuses 40 and 50, respectively.

Accordingly, the additional electronic apparatuses 40 and 50 may receive power using the wireless power transmission apparatus 200 used in the main body 30 of the display apparatus 100 without a separate wireless power transmission apparatus.

The additional electronic apparatuses 40 and 50 may receive power through the third and fourth winding portions 112 and 113 disposed inside the main body 30 of the display apparatus 100, and may be driven separately from the main body 30 of the display apparatus 100.

Also, the main body 30 of the display apparatus 100 may output video/audio signals by interlocking with the additional electronic apparatuses 40 and 50 through wireless communication. The wireless communication method may use an in-band method or an out-band method.

The additional electronic apparatuses 40 and 50 may be any one of a TV, a digital signage, a video wall, a large display panel, a kiosk, and a computer monitor.

The display system 2000 according to the present example embodiment may transmit power to a plurality of electronic apparatuses 40 and 50 and the display apparatus 100 using one wireless power transmission apparatus 200, thereby maximizing utilization of the wireless power transmission apparatus 200.

In addition, in a display system 2000 according to another example embodiment, since the main body 30 and peripheral electronic devices may be selectively interlocked with each other through wireless communication, the display apparatus may be variously utilized.

Since no power cable is used for the main body 30 of the display apparatus 100 and the peripheral additional electronic apparatuses 40 and 50, the user may feel aesthetic through the appearance of the system.

As described above, according to the various example embodiments, the display apparatus may efficiently receive power from an external device and utilize the power. Accordingly, the aesthetics of the user may be satisfied and the power transmission efficiency may be increased.

While the example embodiments have been described, additional variations and modifications of the example embodiments may occur to those skilled in the art once they learn of the basic inventive concepts. Therefore, it is intended that the appended claims shall be construed to include both the above example embodiments and all such variations and modifications that fall within the spirit and scope of the inventive concepts.

What is claimed is:

1. A display apparatus comprising:
   a main body;
   a power receiver configured to receive power from a wireless power transmission apparatus positioned outside of the main body;
   a driver configured to move the power receiver with respect to the main body; and
   a controller configured to control the driver to move the power receiver according to a state of the main body,
   wherein based on the main body being in a standby state, the controller controls the driver to move the power receiver to be disposed on the main body, and
   wherein based on the main body being in a turn-on state, the controller controls the driver to move the power receiver adjacently without contacting the wireless power transmission apparatus so as to adjust wireless power transmission efficiency, and the power receiver transmits the power provided from the wireless power transmission apparatus to the main body of the display apparatus to perform a display operation.

2. The display apparatus of claim 1, wherein the controller comprises a processor configured to control operations of the display apparatus using the power received through the power receiver,
   wherein in response to the display apparatus being in the standby state, the processor is configured to control the driver to move the power receiver to a first position at the main body, and
   wherein in response to the display apparatus being in the turn-on state, the processor is configured to control the driver to move the power receiver from the first position at the main body in a direction of the wireless power transmission apparatus to a second position away from the main body.

3. The display apparatus of claim 1, wherein the power receiver comprises a first power receiving coil configured to generate an induced current by a magnetic field generated in the wireless power transmission apparatus, and
   wherein the main body comprises a second power receiving coil electrically connected to the first power receiving coil, the second power receiving coil being configured to receive the induced current generated by the first power receiving coil.

4. The display apparatus of claim 3, wherein the driver comprises:
   a plurality of connection lines connected to the power receiver;
   a plurality of bobbins connected to the plurality of connection lines; and
   a motor configured to wind or unwind the plurality of connection lines by rotating the plurality of bobbins in a clockwise direction or in a counter-clockwise direction.

5. The display apparatus of claim 4, wherein each of the plurality of connection lines comprises:
   a coil wire electrically connecting the first power receiving coil to the second power receiving coil; and
   an insulating sheath surrounding the coil wire.

6. The display apparatus of claim 5, wherein each of the plurality of bobbins comprises:
   a plate provided with a through hole; and
   a base coupled to the plate, the base including a guide groove configured to guide the plurality of connection lines; and
   wherein the plurality of connection lines passes through the through hole of the plate and is fixed to the guide groove.

7. The display apparatus of claim 6, wherein the base comprises a plurality of threads on which the plurality of connection lines is wound, the plurality of threads being formed on a second surface opposite to a first surface coupled to the plate.

8. The display apparatus of claim 1, further comprising a standby power supplier configured to supply driving power to the driver and to the controller.

9. The display apparatus of claim 1, further comprising a sensor configured to measure a distance between the main body and the wireless power transmission apparatus,
   wherein in response to the display apparatus being turned on, the controller is configured to control the driver to move the power receiver toward the wireless power transmission apparatus until the distance measured by the sensor satisfies a predetermined distance range.

10. The display apparatus of claim 9, further comprising a standby power supplier configured to supply power to the sensor in the standby state when the power receiver is not receiving power from the wireless power transmission apparatus.

11. The display apparatus of claim 1, wherein the power receiver further comprises a speaker.

12. A driving method of a display apparatus, the driving method comprising:
    positioning a power receiver included in the display apparatus on a main body of the display apparatus in response to the main body of the display apparatus being in a standby state;
    moving the power receiver from the main body in the standby state, and moving the power receiver adjacently without contacting a wireless power transmission apparatus in a turn-on state of the main body to adjust wireless power transmission efficiency, the wireless power transmission apparatus being positioned outside of the main body of the display apparatus; and
    receiving power transmitted from the wireless power transmission apparatus through the power receiver and operating a display operation of the display apparatus.

13. The method of driving a display apparatus of claim 12, wherein the moving the power receiver comprises:
    measuring a distance between the main body of the display apparatus and the wireless power transmission apparatus; and
    moving the power receiver in a direction of the wireless power transmission apparatus until the distance satisfies a predetermined reference range.

14. A display system comprising:
    a wireless power transmission apparatus; and
    a display apparatus configured to operate using power transmitted from the wireless power transmission apparatus,
    wherein the display apparatus comprises:
    a power receiver configured to wirelessly receive the power from the wireless power transmission apparatus;
    a driver configured to move the power receiver with respect to a main body of the display apparatus; and
    a processor configured to control the driver to move the power receiver according to a state of the main body,
    wherein based on the main body being in a standby state, the processor controls the driver to move the power receiver to be disposed on the main body, and,
    wherein based on the main body being in a turn-on state, the processor controls the driver to move the power receiver adjacently without contacting the wireless power transmission apparatus so as to adjust wireless power transmission efficiency, and the power receiver transmits the power provided from the wireless power transmission apparatus to the main body of the display apparatus to perform a display operation.

15. The display system of claim 14, further comprising at least one electronic apparatus interlocked with the display apparatus using the power transmitted from the wireless power transmission apparatus.

16. The display system of claim 14, further comprising a remote control signal receiver disposed in the wireless power transmission apparatus and the display apparatus, respectively,
   wherein in response to a turn-on signal of the display apparatus being received by the remote control signal receiver, the wireless power transmission apparatus is configured to apply a current to a power transmission coil provided in the wireless power transmission apparatus to generate a magnetic field.

17. The display system of claim 16, further comprising a standby power supplier configured to supply power to the remote control signal receiver in the standby state when the power receiver is not receiving power from the wireless power transmission apparatus.

18. The display system of claim 14, further comprising a speaker included in at least one of the wireless power transmission apparatus and the power receiver.

* * * * *